United States Patent [19]

Bricot et al.

[11] 4,037,251
[45] July 19, 1977

[54] DATA CARRIER OPTICALLY READ OUT BY TRANSMISSION, AND METHOD OF MANUFACTURING SAID DATA CARRIER

[75] Inventors: Claude Bricot; Bernard Carre; Jean Claude Dubois; Francois Le Carvennec; Jean Claude Lehureau; Claude Puech, all of Paris Cedex, France

[73] Assignee: Thomson-Brandt, Paris, France

[21] Appl. No.: 577,106

[22] Filed: May 13, 1975

[30] Foreign Application Priority Data

May 15, 1974 France ............... 74.16875

[51] Int. Cl.² ............................................. H04N 5/76
[52] U.S. Cl. ............... 358/128; 179/100.3 V; 179/100.3 G
[58] Field of Search ............ 178/6.6 R, 6.7 R, 6.7 A, 178/6.6 DD; 179/100.3 V, 100.3 G, 100.4 R, 100.4 M, 100.41 L; 340/173 LM; 274/41 R, 42 R, 41.6; 250/219; 96/87 R, 67; 428/212; 235/61.12 N; 358/128, 130, 132

[56] References Cited

U.S. PATENT DOCUMENTS

| 1,951,198 | 3/1934 | Mittell | 179/100.3 V |
|---|---|---|---|
| 1,956,626 | 5/1934 | Robbins | 179/100.3 V |
| 3,430,966 | 3/1969 | Gregg | 179/100.3 V |
| 3,518,442 | 6/1970 | Johnson | 179/100.41 L |
| 3,729,317 | 4/1973 | Stimson | 96/87 R |
| 3,814,904 | 6/1974 | Russell | 235/61.12 N |
| 3,833,408 | 9/1974 | Matthies | 178/6.6 R |
| 3,843,399 | 10/1974 | Kaplan | 178/6.6 R |
| 3,848,095 | 11/1974 | Wohlmut | 179/100.3 V |
| 3,931,460 | 1/1976 | Watson | 179/100.3 V |

OTHER PUBLICATIONS

"An Experimental Television Recording and Playback System Using Photographic Discs", by Rice et al.; Journal of the SMPTE; vol. 79, pp. 997-1002; Nov. 1970.
"Webster's New World Dictionary", c. 1970, p. 480.

Primary Examiner—Bernard Konick
Assistant Examiner—Alan Faber
Attorney, Agent, or Firm—Cushman, Darby & Cushman

[57] ABSTRACT

The present invention relates to the protection of relief impressions formed in order to store information on a data carrier which can be optically read out by transmission. The invention relates to a data carrier the relief impression in which is protected by at least one layer transparent vis-a-vis the read-out radiation. The protective layer has an index of refraction that differs from that of the data carrier, per se. Thus, a refractive boundary at the relief impression is maintained and the information encoded in the diffractive relief pattern is preserved.

15 Claims; 4 Drawing Figures

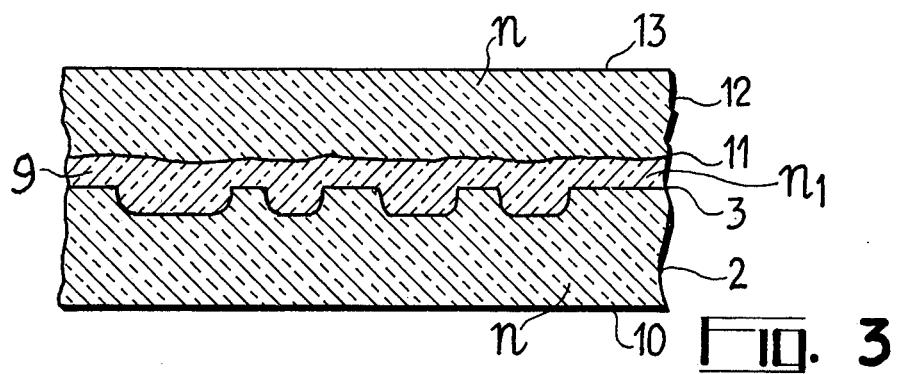
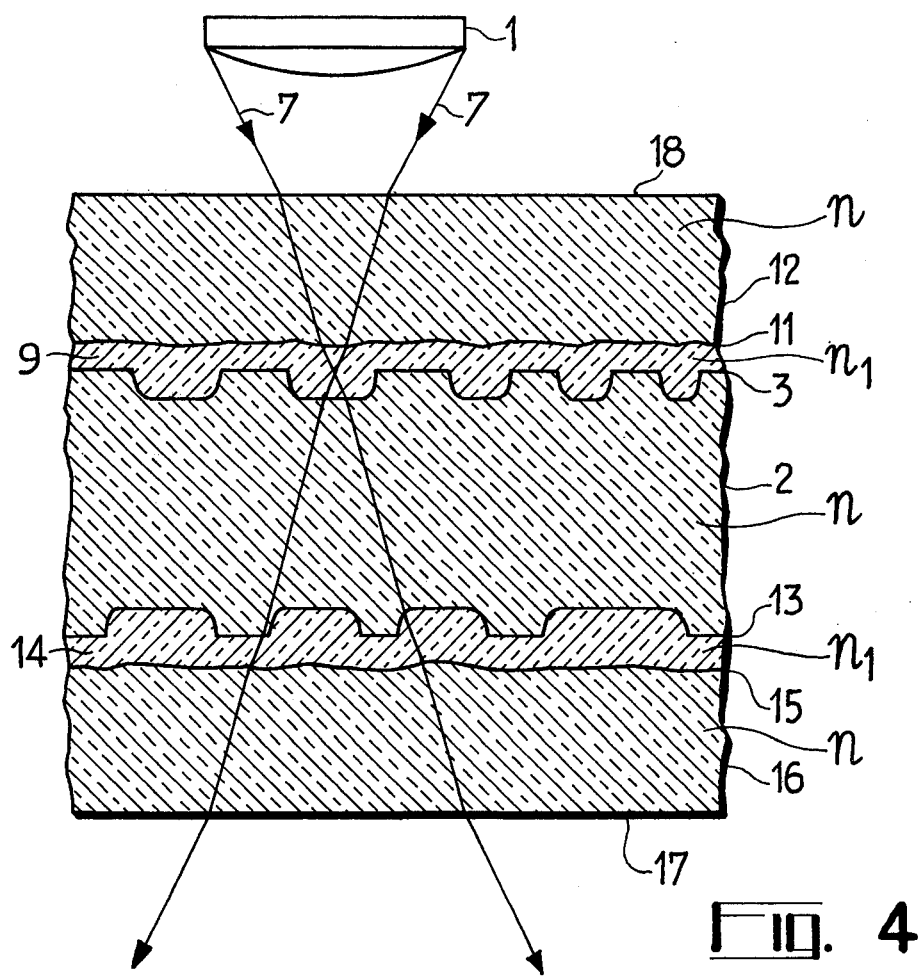

DATA CARRIER OPTICALLY READ OUT BY TRANSMISSION, AND METHOD OF MANUFACTURING SAID DATA CARRIER

The present invention relates to data carriers read by transmission using concentrated optical radiation. These data carriers generally comprise a flexible or rigid sheet of a material which is transparent vis-a-vis the optical read-out radiation and is capable of receiving at at least one of its faces a permanent impression of a track of substantially constant width. The track is made up of a succession of diffractive elements formed by alternating peaks and hollows. When the data carrier is illuminated by a read-out spot of virtually point kind, displacing along the track axis, on passage over the diffractive elements a greater or lesser degree of spread in the optical read-out radiation is observed. This kind of design is appropriate to the transcription of information by angular modulation of a carrier wave. The optical radiation transmitted by the data carrier is picked up selectively by photo-electric transducers which produce electrical read-out signals carrying stored information.

The material used to manufacture the data carrier is easily scratched and the extremely fine impression formed at its surface may undergo major damage as a consequence of scratching and fouling resulting from careless handling of the data carrier.

To avoid any degradation in the stored information, it is necessary to protect the impression by removing it from the influence of external agents such as finger marks, scratches and dust.

The protection of a data carrier designed to be read by reflection of optical radiation, has been achieved by covering the impression with an opaque metal coating. A metal coating cannot be used, however, if the data carrier is to be read by transmission because the protective element must necessarily be transparent to the optical read-out radiation.

In order to protect a data carrier to be read by transmission, the invention proposes that the pressed or moulded impression should be protected by means of a refractive layer following the relief of the impression at the face with which it is in contact therewith, but exhibiting a substantially smooth free face which may be fouled or scratched without affecting information read out.

The material employed to manufacture the protective layer forms a diopter in association with that of which the impression-carrying sheet is made, and it is the boundary separating said materials with differing propagation velocities which results within the body of the data carrier in a diffractive action upon the read out radiation, thus making it possible to detect the stored information. Since the protected data carrier comprises two transparent media having distinct propagation velocities, and separated from one another by a boundary having the relief of the aforementioned impression, it may be considered as a phase object. This phase object, upon being illuminated with radiant energy having a wavelenght in the order of the size of the peaks or troughs will provide an effective diffraction of said radiant energy. Accordingly, no phase object, and no diffraction would be realized if the propagation velocities were chosen equal.

In accordance with a first object of the present invention there is provided: A method of manufacturing a data carrier optically readable by transmission using a predetermined optical radiation, which comprises:

forming on at least one of the faces of a substrate transparent vis-a-vis said optical radiation a relief impression made of a succession of peaks and troughs arranged along a track; said succession of peaks and troughs being representative of the transcription of a carrier wave angularly modulated by said data, and covering said relief impression with at least one protective layer transparent vis-a-vis said optical radiation; the upper face of said protective layer being substantially smooth and the lower face of said protective layer being immediately adjacent said relief impression for building up a refractive boundary having the profile of said relief impression and thereby causing diffraction of said optical radiation.

In accordance with a further object of the present invention there is provided: A data carrier manufactured in accordance with the above mentioned method, which comprises a sheet of material transparent to the read out optical radiation; said sheet carrying a relief impression made of a succession of peaks and troughs arranged along a track; said succession of peaks and troughs being representative of the transcription of a carrier wave angularly modulated by said data; said data carrier further comprising at least one protective layer transparent to said read out optical radiation; said protective layer having a substantially smooth upper face and a lower face forming with said sheet a boundary intimately following said relief impression.

For a better understanding of the present invention and to show how the same may be carried into effect reference will be made to the ensuring description and the attached figures, among which:

FIG. 3 is a section through a variant embodiment of the data carrier in accordance with the invention;

FIG. 4 is a section through another embodiment of the data carrier in accordance with the invention.

Figure 1:
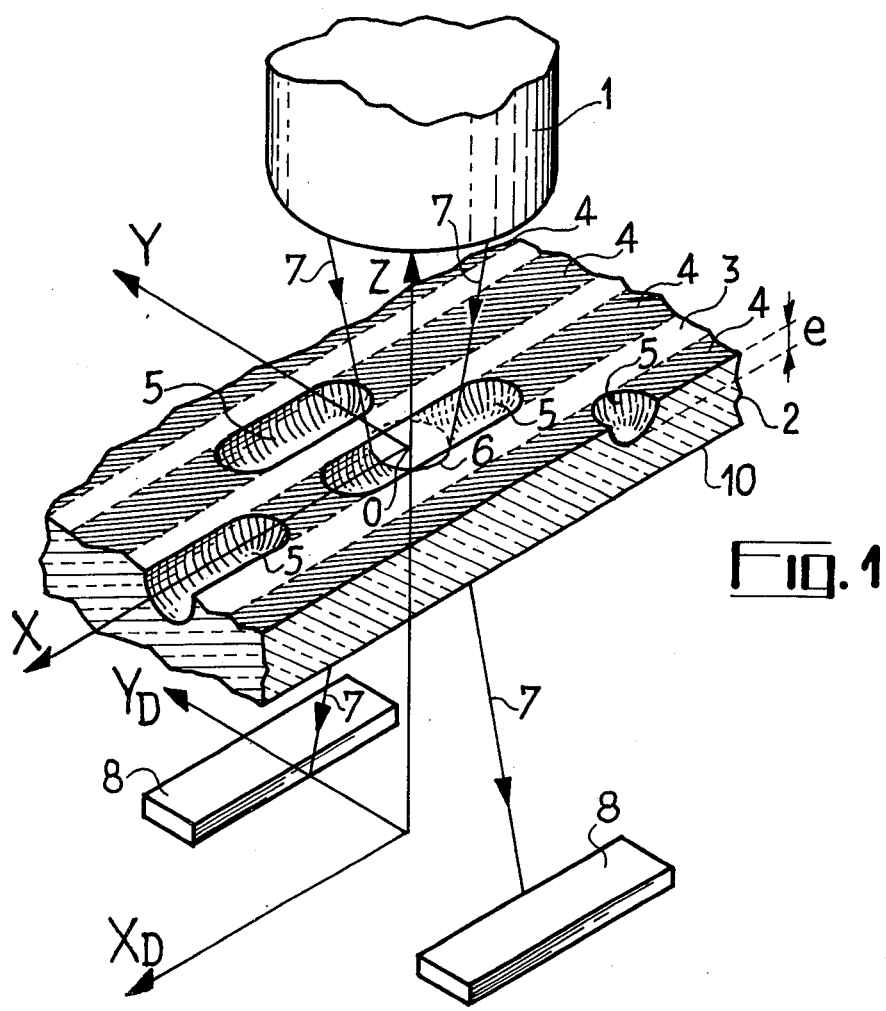
FIG. 1 illustrates a fragment of a data carrier and of essential elements for effecting read-out by transmission.

In FIG. 1, there can be seen a fragment of a data carrier of known kind, comprising a sheet 2 of refractive material, transparent vis-a-vis the optical radiation 7 coming from a read-out head 1. The sheet 2 is capable of receiving at its face 3, the relief impression of a track of which several sections 4 have been shown in FIG. 1. These track sections can, by way of non-limitative example, belong to successive turns of a spiral track in which case the data carrier fragment 2 will belong to a flexible or rigid disc. The track 4, at the face 3 of the data carrier 2, occupies a cross-hatched range whose substantially constant width is of the order of one micron. It comprises a succession of hollow or projecting diffractive elements 5 the length and spacing of which vary along the track axis OX. In the case of a disc, the axis OY perpendicular to the axis OX is radial.

The read out of the data carrier 2 is effected in a manner known per se, by means of a concentrated spot 6 projected by the read out head 1. In view of the small size of the diffractive elements 5 in the direction OY, and considering the mismatch of the propagation velocities at the air carrier interface, diffractive spreading of the read out radiation 7 each time the spot 6 encounters the diffractive element 5 passing in the direction OX, will take place. This spreading is detected optically by the picking up of the read out radiation which is transmitted across the data carrier 2, on photoelectric transducers 8 located in the detection plate $X_D Y_D$. The impression in the face 3 of the data carrier being constituted by a succession of diffractive elements of variable length and spacing, there will be picked off across the terminals of the transducers 8 an electrical signal which is due to the displacement of the spot along the track. This signal generally takes the form of a carrier wave angularly modulated by the information.

In the case shown in FIG. 1, the extremely fine impression of the track is exposed, rendering it highly vulnerable to scratching, the effects of dust and to clogging by spots of grease. In order to protect the impression against these effects which can deteriorate it, the invention provides for the impression to be covered by at least one transparent protective layer.

Figure 2:
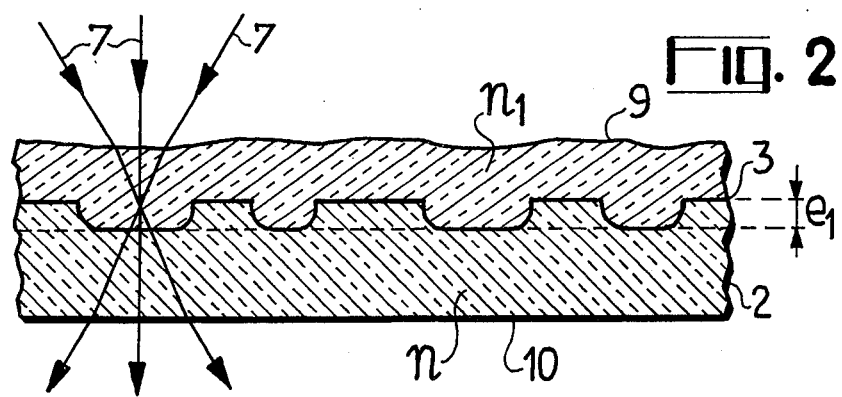
FIG. 2 is a section through a data carrier with an impression protected in accordance with the invention.

In FIG. 2, there can be seen in section a data carrier equipped with a protective layer of this kind. It consists of a transparent sheet 2 whose top face 3 has received an impression of depth $e_1$ by an operation of pressing or moulding. Above the face 3 there has been formed a transparent protective layer which has a substantially smooth free face 9 which does not follow the profile of the impression. By using for the protective layer a refractive material whose refractive index $n_1$ differs from that of the sheet 2, the impression forms a refractive boundary separating two transparent media having different propagation velocities. The diffractive action of this boundary upon the read out radiation 7 depends upon the respective refractive indices $n$ and $n_1$ of the sheet 2 and the protective layer. The depth $e_1$ of the impression produces a phase shift $\Delta\phi$ in the read out radiation when comparing the transmissions through a trough and through a peak of the impression. It can be shown that for a read out ray passing through the data carrier by the shortest trajectory, the phase shift $\Delta\phi$ is given by the relationship:

$$\Delta\phi = 2\pi \frac{(n - n_1) e_1}{\lambda}$$

In this relationship, $\lambda$ is the wavelength of the read out radiation. The value $\Delta\phi$ which yields the optimum diffractive action is equal to $\pi/2$. Given $n$ and $n_1$, it is therefore possible to calculate the optimum impression depth $e_1$ in the presence of a protective layer.

It is found that this depth $e_1$ is greater than the depth $e$ which should be used in the absence of any protective layer. These two depths are associated by the relationship:

$$e_1 = \frac{e(n - 1)}{n - n_1}$$

The difference is the greater the less the refractive index $n_1$ of the protective layer differs from that $n$ of the sheet carrying the impression. In order that the depth $e_1$ does not become too great, it is convenient to use a protective material having a refractive index $n_1$ which differs as far as possible from that $n$ of the sheet which receives the impression.

By way of non-limitative example, if the base of the data carrier is constituted by a sheet of polyvinylchloride whose refractive index is close to $n = 1.52$ for the read out wave length of $\lambda = 0.6$ microns, then the protective layer can be made from the following materials: Cellulose nitrate (collodion, $n_1 = 1.5$), cellulose acetate ($n_1 = 1.46$) polyvinyl carbazole ($n_1 = 1.68$), polymethyl methacrylate ($n_1 = 1.62$), or parylene ($n_1 = 1.66$). It is equally possible to use a compound of the silicone class, having a low refractive index. These substances are chosen for their transparency to the read out radiation and for their refractive index $n_1$ which is greater or less than that of polyvinylchloride. Another criterion governing this choice is the solubility of these materials in a solvent which does not dissolve polyvinylchloride.

Experience shows that a small difference in refractive index ($n - n_1$) is sufficient to result in a substantial diffractive effect upon the read out radiation. By adopting a refractive index $n_1$ which ranges between 1 and $n$, transmission of the read out radiation at the free face of the protective layer is improved.

In FIG. 2, it can be seen how the impression is effectively protected against external agents which could deteriorate the data carrier, whilst the rear face 10 of the sheet 2 and the smooth face 9 of the layer protecting the impression, are still exposed to these agents. The faces 9 and 10 can therefore be scratched and fouled without this kind of degradation having any really perceptible effect upon read out.

This is explained by the fact that the read out radiation 7 forms a beam which converges at the impression 3. The intersection between the read out beam and the free faces 9 and 10 involves illuminated zones of much larger area than the virtually point spot which performs the fine scanning of the impression 3. The disturbances produced by scratches, dust and grease spots at the zones of entry and exit of the read out beam, are not serious unless the defects are of a size comparable with the size of these zones themselves.

By way of non-limitative example, the dimension of the read out spot may be of the order of some few microns and the sheet 2 can have a thickness of 150 microns. With a wide beam, the beam exit zone may have a diameter of 150 microns and the same applies to the beam entry zone if the protective layer has the same thickness. A protective layer of some few tens of microns in thickness is sufficient to render insignificant the level of the disturbances resulting from the surface condition of the data carrier, although this thickness may be reduced.

In the case where the protective layer of refractive index $n_1$ has a thickness of some few microns only, it can be covered with a second transparent protective layer which can be made, if required, of the same material as the sheet carrying the impression.

This variant embodiment has been shown in section in FIG. 3 which illustrates a sheet 2 carrying the relief impression 3. The impression 3 has been covered with a first layer 9 of refractive index $n_1$ differing from that $n$ of the sheet 2. The substantially smooth face 11 of the first layer 9 is covered by a second protective layer 12 having a free face 13 located a relatively long way away from the impression 3. This second layer can have the same refractive index $n$ as the sheet 2.

Another variant embodiment, illustrated in section in FIG. 4 shows a sheet 2 carrying impressions 3 and 13 at both its faces, which are respectively protected by layers 9, 12 and 14, 16. The free faces 18 and 17 are located relatively far away from the impressions 3 and 13 respectively, and the intermediate smooth faces 11 and 15 do not follow the relief profile of the impressions 3 and 13. The read out beam 7 shown in FIG. 4 is illustrated in the position in which it is scanning the impression 3; it illuminates a wide zone of the impression 13, thus ensuring that the latter impression is not read out at the same time. It should be pointed out that in all the figures, the dimensions of the impressions have been very much exaggerated in relation to the other dimensions.

The manufacture of a data carrier protected in accordance with FIG. 2 to 4, commences with the manufacture of a bare, impressed data carrier as shown in FIG. 1. Then, at least one protective layer has to be deposited, which has a substantially smooth upper face and a lower face which faithfully follows the relief profile of the impression. One method of effecting this deposition, consists in using a solvent which does not affect the impression-carrying sheet. This solvent makes it possible to dissolve the material chosen for use as the protective layer. In this way, a solution is obtained capable of forming a solid film by evaporation of the solvent.

To obtain a smooth-surfaced film of constant thickness, the solution can be placed in a vessel and the impression-carrying sheet immersed in it. By withdrawing the sheet from the bath at a constant rate, an appropriate film is obtained which can be allowed to dry.

It is also possible to laminate the film onto the impression by a roller technique or by atomising the solution. By way of non-limitative example, it is possible to use a 5% collodion solution in one litre of ether and at the moment at which it is used, to dilute the solution by adding another litre of ether to it. The bath liquid thus obtained makes it possible to coat a disc by a dipping operation. The disc is then withdrawn from the bath at a rate of 3cm/sec in order to obtain a uniform layer of the desired thickness. Instead of using a laminating technique, it is possible for example in the case of Parylene, to form a protective layer by deposition from the gas phase.

The impression-carrying sheet is arranged in a deposition chamber through which a monomer of molecules of Paryxylylene in the gaseous state, is flowing. The gas flow is produced by vapourisation of di-para-xylylene followed by pyrolysis, the deposit forming in the chamber by polymerisation of the monomer at ambient temperature and at a low pressure of 0.1 mm hg.

Where a coating operation is used, the impression is coated completely, without entrapping any air bubbles, if a very fluid solution is used. If the fluidity of the solution is not as great, then air bubbles can be prevented by carrying out the operation under vacuum.

What we claim is:

1. A method of manufacturing a data carrier optically readable by transmission using a predetermined optical radiation, which comprises:

forming on at least one of the faces of a substrate transparent vis-a-vis said optical radiation a relief impression made of a succession of diffractive elements in the form of alternate peaks and troughs arranged along a track of substantially constant width; said succession of diffractive elements being of non uniform length and spacing along the axis of said track, and covering said relief impression with at least one protective layer transparent vis-a-vis said optical radiation; the upper face of said protective layer being substantially smooth and the lower face of said protective layer being immediately adjacent said relief impression to create a refractive boundary having the profile of said relief impression and thereby causing diffractive spreading of said optical radiation by said diffractive elements.

2. A method as claimed in claim 1, which comprises the further step of covering said one protective layer with a further protective layer also transparent vis-a-vis said optical radiation.

3. A method as claimed in claim 1, wherein said protective layer is made of cellulose nitrate; the step of, covering said relief impression being performed using a solution of said cellulose nitrate in a solvent.

4. A method as claimed in claim 3, wherein said solvent is ether.

5. A data carrier manufactured in accordance with the method of claim 1, which comprises a sheet of material transparent to the read out optical radiation; said sheet carrying a relief impression made of a succession of peaks and troughs arranged along a track; said succession of peaks and troughs being representative of the transcription of a carrier wave angularly modulated by said data; said data carrier further comprising at least one protective layer transparent to said read out optical radiation; said protective layer having a substantially smooth upper face and a lower face forming with said sheet a refractive boundary intimately following said relief impression.

6. A data carrier as claimed in claim 5, comprising a further protective layer also transparent vis-a-vis said optical radiation; said further protective layer adhering to said substantially smooth upper face.

7. A data carrier as claimed in claim 5, wherein the refractive index of the material of said sheet is higher than that of the material constituting said protective layer.

8. A data carrier as claimed in claim 5, wherein the refractive index of the material constituting said protective layer is higher than that of the material of said sheet.

9. A data carrier as claimed in claim 6, wherein the material constituting said further protective layer is identical to the material constituting said sheet.

10. A data carrier as claimed in claim 5, wherein said sheet takes the form of a disc; said track being a spiral track.

11. A data carrier as claimed in claim 5, wherein the assembly comprising said sheet and said protective layer is flexible.

12. A data carrier as claimed in claim 5, wherein the material constituting said protective layer is a residue left by a liquid substance after evaporation of a solvent; the material constituting said sheet being insoluble in said solvent.

13. A data carrier as claimed in claim 5, wherein the material constituting said protective layer is a deposit produced on said sheet in the presence of a monomeric gas phase; said material being converted to the solid phase by polymerisation of said monomeric gas phase.

14. A data carrier as claimed in claim 5, wherein said sheet carries on each of its two major faces, a relief impression protected with said protective layer.

15. A data carrier as claimed in claim 5, wherein the optical delay undergone along a transmission path of the transmitted beam passing through one of said peaks and the optical delay undergone along a transmission path of the transmitted beam passing through one of said troughs differ from one another by a quarter of the wavelength of said optical radiation.

* * * * *